United States Patent
Tsirkin et al.

(10) Patent No.: US 12,204,925 B2
(45) Date of Patent: *Jan. 21, 2025

(54) SECURING VIRTUAL MACHINES IN COMPUTER SYSTEMS

(71) Applicant: Red Hat Israel, Ltd., Raanana (IL)

(72) Inventors: Michael Tsirkin, Westford, MA (US); Amnon Ilan, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,567

(22) Filed: Jan. 31, 2022

(65) Prior Publication Data

US 2022/0156103 A1 May 19, 2022

Related U.S. Application Data

(63) Continuation of application No. 16/203,060, filed on Nov. 28, 2018, now Pat. No. 11,237,859.

(51) Int. Cl.
*G06F 9/455* (2018.01)
*G06F 9/48* (2006.01)
(Continued)

(52) U.S. Cl.
CPC ...... *G06F 9/45558* (2013.01); *G06F 9/45545* (2013.01); *G06F 9/4856* (2013.01);
(Continued)

(58) Field of Classification Search
None
See application file for complete search history.

(56) References Cited

U.S. PATENT DOCUMENTS

| | | | | |
|---|---|---|---|---|
| 8,327,059 B2* | 12/2012 | Chen | ...... | G06F 21/79 718/1 |
| 8,327,353 B2* | 12/2012 | Traut | ...... | G06F 9/45558 718/1 |

(Continued)

FOREIGN PATENT DOCUMENTS

| | | | |
|---|---|---|---|
| CN | 108062269 A | 5/2018 | |
| EP | 2846273 A1 * | 3/2015 | ...... G06F 16/25 |

(Continued)

OTHER PUBLICATIONS

Azhar Sayeed, "Is NFV ready for containers?", Vertical Industries Blog (https://ww.redhat.com/blog/verticalindus), How open source drives innovation across industries, Jun. 28, 2016, 8 pages.
(Continued)

*Primary Examiner* — Matthew J Brophy
(74) *Attorney, Agent, or Firm* — Womble Bond Dickinson (US) LLP (57) ABSTRACT

Aspects of the disclosure provide for mechanisms for securing virtual machines in a computer system. A request for a resource is received by a processing device. The request is initiated by a guest application. A determination is made by the processing device of whether an initialization of the guest application is completed. In response to a determination that the initialization of the guest application is completed, at least one system call associated with the request initiated by the guest application is blocked to reject execution of the request for the resource.

20 Claims, 4 Drawing Sheets

(51) Int. Cl.
*G06F 9/50* (2006.01)
*H04L 43/04* (2022.01)

(52) U.S. Cl.
CPC .......... *G06F 9/5005* (2013.01); *G06F 9/5077* (2013.01); *H04L 43/04* (2013.01); *G06F 2009/45575* (2013.01); *G06F 2009/45587* (2013.01)

(56) References Cited

U.S. PATENT DOCUMENTS

| | | | |
|---|---|---|---|
| 8,381,284 B2* | 2/2013 | Dang .................. | G06F 9/468 718/1 |
| 8,407,699 B2* | 3/2013 | Larkin ................ | G06F 9/45558 718/1 |
| 8,539,222 B2 | 9/2013 | Ashok et al. | |
| 9,021,476 B1 | 4/2015 | Pratt | |
| 9,292,328 B2* | 3/2016 | Pratt .................. | G06F 9/45545 |
| 9,454,497 B2* | 9/2016 | Nakajima ............. | G06F 9/455 |
| 9,715,410 B2* | 7/2017 | Bonzini ............... | G06F 9/45558 |
| 9,864,859 B2 | 1/2018 | Sood et al. | |
| 9,880,871 B2* | 1/2018 | Tsirkin ................ | G06F 9/45558 |
| 10,043,007 B2 | 8/2018 | Brech et al. | |
| 10,564,997 B2 | 2/2020 | Hong .................. | G06F 21/53 |
| 2007/0050764 A1* | 3/2007 | Traut ................. | G06F 9/45558 718/1 |
| 2014/0157363 A1* | 6/2014 | Banerjee ............... | H04L 63/10 726/2 |
| 2016/0048464 A1* | 2/2016 | Nakajima ............. | G06F 9/5016 711/152 |
| 2016/0180079 A1* | 6/2016 | Sahita ................. | G06F 21/52 726/22 |
| 2016/0224383 A1* | 8/2016 | Bonzini .............. | G06F 9/45558 |
| 2016/0379003 A1* | 12/2016 | Kapoor ............... | G06F 9/45558 726/27 |
| 2017/0109197 A1* | 4/2017 | Coleman ............. | G06F 9/45558 |
| 2017/0257399 A1* | 9/2017 | Mooring ................ | H04L 69/00 |
| 2018/0129525 A1* | 5/2018 | Hong .................. | G06F 12/1009 |
| 2018/0247082 A1* | 8/2018 | Durham .................. | G06F 21/53 |
| 2018/0373895 A9* | 12/2018 | Durham .................. | G06F 21/71 |
| 2019/0034633 A1* | 1/2019 | Seetharamaiah ... | G06F 9/45558 |
| 2019/0044971 A1* | 2/2019 | Sukhomlinov ..... | G06F 12/1441 |
| 2020/0081737 A1* | 3/2020 | Peter ...................... | G06F 9/485 |
| 2020/0167180 A1* | 5/2020 | Tsirkin .................. | G06F 9/4856 |

FOREIGN PATENT DOCUMENTS

| | | |
|---|---|---|
| WO | 2018-05-22 A | 6/2016 |
| WO | 2016097954 A1 | 6/2016 |

OTHER PUBLICATIONS

Intel, "Container and Kernel-Based Virtual Machine (KVM) Virtualization for Network Function Virtualization (NFV)", White Paper, Aug. 2015, 26 pages.
Bhardwaj, Rishi, et al. "A Choices Hypervisor on the ARM architecture." University of Illinois 5 (2006). (Year: 2006).
Li, Chunxiao, Anand Raghunathan, and Ni raj K. Jha. "Secure virtual machine execution under an untrusted management OS." 2010 IEEE 3rd International Conference on Cloud Computing. IEEE, 2010. (Year: 2010).
Shi, Jiangyong, Yuexiang Yang, and Chu an Tang. "Hardware assisted hypervisor introspection." SpringerPlus 5.1 (2016): 1-23. (Year: 2016).

* cited by examiner

```
RECEIVE A FIRST RESOURCE REQUEST INITIATED BY AN
APPLICATION RUNNING ON A VIRTUAL MACHINE DURING
INITIALIZATION OF THE APPLICATION
                                                    310
```

```
ALLOCATE, VIA A HYPERVISOR, A RESOURCE TO THE
APPLICATION IN VIEW OF THE FIRST RESOURCE REQUEST
                                                    320
```

```
RECEIVE A MESSAGE INDICATING COMPLETION OF THE
INITIALIZATION OF THE APPLICATION AND DETECT THE
COMPLETION OF THE INITIALIZATION OF THE APPLICATION 330
```

```
BLOCK ONE OR MORE HYPERCALLS INITIATED BY THE VIRTUAL
MACHINE IN RESPONSE TO THE MESSAGE AND/OR THE
DETECTION OF THE COMPLETION OF THE INITIALIZATION OF THE
APPLICATION 340
```

SECURING VIRTUAL MACHINES IN COMPUTER SYSTEMS

RELATED APPLICATIONS

This application is a continuation application of co-pending U.S. patent application Ser. No. 16/203,060, filed Nov. 28, 2018, the entire contents of which is incorporated by reference herein.

TECHNICAL FIELD

The implementations of the disclosure relate generally to computer systems and, more specifically, to securing virtual machines in computer systems.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the disclosure provide for mechanisms for securing virtual machines in computer systems. Managing resources for virtual machines may be a challenging task. In some implementations, a hypervisor and a guest supervisor may be used to manage resources for a virtual machine. To avoid overhead caused by the management of the resource using both the host hypervisor and the guest supervisor, prior solutions for virtual machine management may move all resource management to the hypervisor. For example, the guest supervisor may forward requests for resource allocation from guest applications to the hypervisor (e.g., by making system calls). The hypervisor may then allocate resources responsive to the requests. However, the guest hypervisor may serve as an interface between the virtual machine and the hypervisor that may facilitate attacks to the hypervisor by malicious traffic handled by the guest application. The prior solutions lack mechanisms for preventing such attacks.

Aspects of the disclosure address the above and other deficiencies of the prior solutions by providing mechanisms (e.g., systems, methods, machine-readable media, etc.) for securing virtual machines. To initialize a guest application running on a virtual machine, resources (e.g., memory, processing resources) may be allocated to the guest application by a hypervisor. The guest application does not process traffic (e.g., packets transmitted from a virtual or physical device associated with the virtual machine) during the initialization of the guest application. As such, the hypervisor may permit system calls made by the guest application during the initialization of the guest application. For example, the guest application may send a resource request for allocation of a resource by making a system call. A guest supervisor may forward the resource request to the hypervisor. The hypervisor may then allocate the requested resource to the guest application.

Upon completion of the initialization of the guest application, the guest application may initiate packet processing (e.g., receiving, transmitting, processing, etc. packets related to a device associated with the virtual machine). After the completion of the initialization of the guest application, system calls initiated by the guest application may be regarded as being unexpected activities by the guest application. For example, after the initialization, the guest application may operate in a poll mode in which only access to memory is required. A system call initiated by the guest application may thus be considered as an unexpected activity that may relate to malicious incoming traffic.

In some embodiments, the guest application may generate and transmit a message indicating the completion of the initialization of the guest application. The guest supervisor may forward the message to the hypervisor (e.g., via a hypercall). Upon receiving the message, the hypervisor may start blocking following system calls (e.g., hypercalls) initiated by the guest application (e.g., by configuring a virtual machine control structure associated with the virtual machine). In some embodiments, the hypervisor may block virtual machine exits initiated by the virtual machine while permitting VM exits initiated by the hypervisor (e.g., a virtual machine exit caused by a hypervisor interrupt). A virtual machine exit may involve a transfer of execution control of the virtual machine to the hypervisor from the virtual machine. In some embodiments, the hypervisor may receive a system call for resource allocation initiated by the guest application after the initialization of the guest application. The hypervisor may reject the resource allocation.

Accordingly, the mechanisms described herein include technology that enhances virtualization technology for a computer system. A guest application as described herein does not process packets originated from a device coupled to the virtual machine during the initialization. The guest application may initiate processing of packets and/or traffic after the initialization of the guest application. The technology may enable enhanced security for virtual machines by providing a VM securing mechanism that may permit systems calls initiated by a guest application during initialization of the guest application while blocking system calls initiated by the guest application after the initialization. As such, the mechanism can prevent attacks to a host by malicious incoming traffic handled by the guest application. Compared to conventional virtualization techniques, the mechanisms disclosed herein may secure virtual machines using a container-like configuration.

Figure 1:
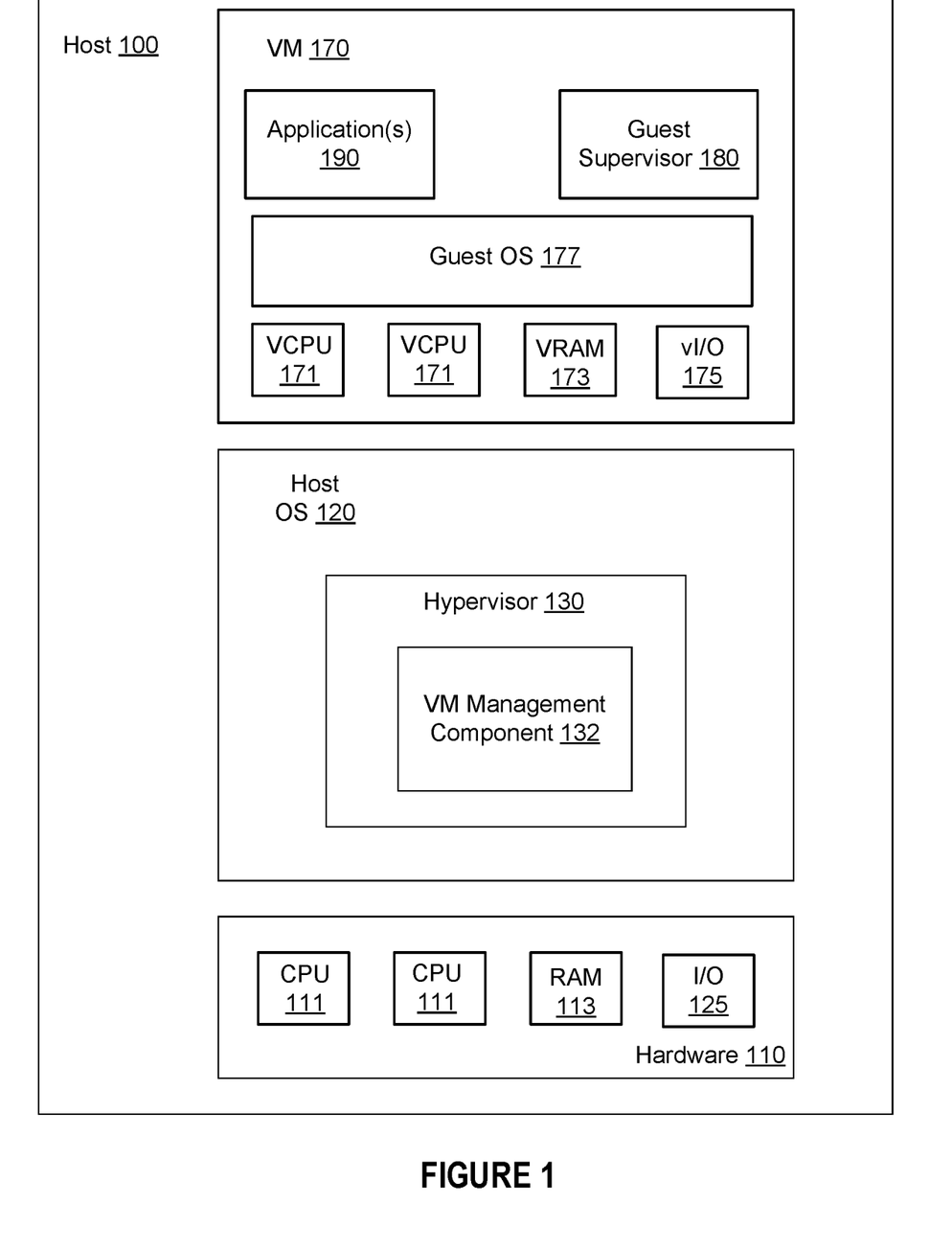
FIG. 1 is a block diagram of a computer system in which implementations of the disclosure may operate.

FIG. 1 is a block diagram of an example of a host computer system 100 according to some embodiments of the present disclosure. The computing system 100 may be a server, a workstation, a personal computer (PC), a mobile phone, a palm-sized computing device, a personal digital assistant (PDA), etc. "Computer system" as used herein may be and/or include a system comprising one or more processors, one or more memory devices, and one or more input/output (I/O) interfaces.

As illustrated, host computer system 100 may include hardware 110. Hardware 110 may include any hardware component, such as one or more processors (e.g., host central processing units (CPUs)), memory devices, I/O devices, etc. Local connections within host computer system 100, including connections between the processors and the memory devices, may be provided by one or more local buses (not shown) of a suitable architecture.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some embodiments.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

As illustrated in FIG. 1, host computer system 100 may execute (run) one or more virtual machines (VMs) 170 by executing a software layer 130, often referred to as "hypervisor," above the hardware and below the virtual machines. In certain implementations, hypervisor 130 may be a component of operating system 120 executed by the corresponding host computer system 100. Alternatively, hypervisor 130 may be provided by an application running under host operating system 120, or may run directly on the corresponding host computer system 120 without an operating system beneath it. Hypervisor 130 may abstract the physical layer, including processors 111 (e.g., central processing units (CPUs)), memory 113, I/O devices 115, etc. and present this abstraction to virtual machines 170 as virtual devices, including virtual processors (also referred to as virtual central processing units (vCPUs)) 171, virtual memory 173, virtual I/O devices 175, etc. A hypervisor 130 may abstract the physical layer and present this abstraction to virtual machines 170 to use, by providing interfaces between the underlying hardware and virtual devices of virtual machines. The VM 170 may execute a guest operating system (OS) 177 which may utilize the underlying virtual processors 190, virtual memory 192, virtual I/O devices 194, etc.

In certain implementations, processor virtualization may be implemented by the hypervisor scheduling time slots on one or more physical processors for virtual processors. In an illustrative example, a virtual processor may be implemented by a processing thread that may be scheduled to run on one of the host physical processors.

Device virtualization may be implemented by intercepting virtual machine memory read/write and/or input/output (I/O) operations with respect to certain memory and/or I/O port ranges, and by routing hardware interrupts to a virtual machine associated with the corresponding virtual device. Memory virtualization may be implementing by a paging mechanism allocating the host RAM to virtual machine memory pages and swapping the memory pages to a backing storage when necessary.

The virtualization of the vCPU may allow the VM 170 to execute directly on the physical CPU. Software executing in the VM 170 operates with reduced privileges such that the hypervisor 130 retains control over resources. The hypervisor 130 may retain selective control of the processor resources, physical memory, interrupt management, and I/O. Operations performed by the physical CPU may be referred to as virtual machine extension (VMX) operations. Examples of VMX operations may include VMX root operations and VMX non-root operations. VMX root operations may be operations performed by the hypervisor. VMX root operations may be treated like any other root operations where full control over the physical CPU is allowed. VMX non-root operations may be operations performed by the VM 170. VMX non-root operations may be restricted to facilitate virtualization.

Transferring control of the physical CPU 111 between VMX root operation and VMX non-root operation may be referred to as a VMX transition. Examples of VMX transitions may include VM entries and VM exits. VM entries may involve transferring physical CPU control from VMX root operation (hypervisor) to VMX non-root operation (VM). VM exits may involve transferring physical CPU control from VMX non-root operation (VM) to VMX root operation (hypervisor). A VM exit may refer to a transition from an unprivileged guest execution mode to the privileged virtual machine extension (VMX) root execution mode. The VM exit may be executed in response to detecting one of the triggering events (such as an attempt to execute a certain privileged instruction or to access a certain memory address).

In some embodiments, the VM 170 may be associated with a virtual machine control data structure (VMCS). The VMCS may be a data structure in memory associated with the VM 170 that is used to manage transitions between VMX root operations and VMX non-root operation and processor behavior in VMX non-root operations. The VMCS may contain a guest-state area, a host-state area, VM-execution control fields, VM exit control fields, VM entry control fields, VM exit information fields, etc. The guest-state area may contain data describing the processor state of the VM upon a VM exit, such as data currently stored in processor registers at the time the VM exit is triggered. Upon a VM exit, data from the processor registers are saved to the guest-state area. The data from the guest-state area may be used to reload the processor state of the VM into the processor registers prior to VM entry. The host-state area may contain data describing the processor state to be loaded into the processor registers upon a VM exit. The VM-execution control fields may contain data describing processor behavior during a VMX non-root operation. The VM exit control fields contain data describing behavior for different kinds of VM exits. The VM entry control fields may contain data describing behavior for different kinds of VM entries. The VM exit information fields may be used to store information related to recent VM exits.

The VM 170 may include a guest supervisor 180 that may provide a Linux user-space kernel. The guest supervisor 180 may intercept system calls made by one or more guest applications 190 running on the VM 170 and may act as a guest kernel without the need for translation through virtualized hardware. In some embodiments, the guest supervisor 180 may be implemented as a user-space application. As such, it may make some host system calls to support its operations. As an example, the guest application 190 may require resources (e.g., guest memory, virtual CPU) by making one or more system calls to the host OS 120. The guest supervisor 180 may intercept the system calls and may forward the system calls to the hypervisor 130 for resource allocation. The guest supervisor 180 may be implemented using one or more user-space processes. For example, the guest supervisor 180 may be implemented using a first process including the kernel and is responsible for executing user code and handling system calls. As another example, the guest supervisor 180 may be implemented using a second process that can perform file system operations. In some embodiments, the guest supervisor 180 may include an Open Container Initiative (OCI) runtime that provides an isolation boundary between the guest application 190 and the host OS 120. The guest supervisor 180 may be and/or include gVisor in some embodiments.

In some embodiments, the guest application 190 may be a data plane development kit (DPDK) application executing on hypervisor 145. DPDK is a framework of libraries and network interface controller drivers for fast packet processing. For example, DPDK may provide a poll mode driver (not shown in FIG. 1) to configure devices relating to the guest application 190 and their respective queues and to enable the application 190 to operate in a poll mode. In the poll mode, the poll mode driver and the application 190 running in the guest OS will constantly spin waiting for an I/O to be available. The poll mode driver may receive, process, and deliver packets in the guest application 190 without interrupts. As such, the guest application 190 can process the I/O almost instantly instead of waiting for an interrupt to occur.

The hypervisor 130 may include a virtual machine (VM) management component 132 that may manage one or more virtual machines 170 running on host 100. For example, the VM management component 132 may perform operations to secure the VM 170. In some embodiments, during an initialization stage of the guest application 190, the VM management component 132 may allocate resources to the guest application 190 to initialize the guest application 190. The initialization of the guest application 190 does not involve processing traffic between the guest application 190 and a device (e.g., a virtual device, a physical device). For example, the guest application 190 does not receive, transmit, process, etc. packets related to the device during the initialization of the guest application 190.

During the initialization of the guest application 190, the VM management component 132 may permit system calls made by the guest application 190. For example, the guest application 190 may send a resource request for allocation of a resource (e.g., a certain amount of guest memory, a processing unit, a thread, etc.) by making a system call. The guest supervisor 180 may intercept the system call and may forward the resource request to the VM management component 132. The VM management component 132 may then allocate the requested resource to the guest application 190.

Upon completion of the initialization of the guest application 190, the guest application 190 may initiate packet processing (e.g., receiving, transmitting, processing, etc. packets related to a device). The guest application 190 may also run on the virtual machine using the allocated resource. After the completion of the initialization of the guest application 190, system calls initiated by the guest application 190 may be regarded as being unexpected activities by the guest application 190. For example, the guest application 190 may operate in the poll mode as described above in which only access to memory is required. A system call initiated by the guest application 190 may thus be considered as an unexpected activity that may relate to malicious incoming traffic.

In some embodiments, the guest application 190 may generate and transmit a message indicating the completion of the guest application 190. The guest supervisor 180 may forward the message to the VM management component 132 (e.g., via a hypercall). Upon receiving the message, the VM management component 132 may start blocking following system calls (e.g., hypercalls) initiated by the VM 170. For example, the VM management component 132 may block VM exits initiated by the VM 170 while permitting VM exits initiated by the hypervisor 130. In some embodiments, the VM management component 132 may block the VM exits initiated by the VM 170 by configuring the VMCS associated with the VM 170. For example, the VM management 132 may configure the VMCS associated with the VM 170 to disable system calls initiated by the guest application and/or virtual machine. As another example, the VM management 132 may configure the VMCS to cause a CPU associated with the VM 170 to transfer execution control of the VM 170 to the guest supervisor 180 in response to receiving a request for a VM exit initiated by the VM 170.

In some embodiments, the VM management component 132 may receive a resource request (e.g., a hypercall) initiated by the guest application 190 after the initialization of the guest application 190. The VM management component 132 may reject allocation of resources in view of the resource request. In some embodiments, the hypervisor 130 and/or the VM management component 132 may perform operations described in connection with FIGS. 2-3 to secure the VM 170.

Figure 2:
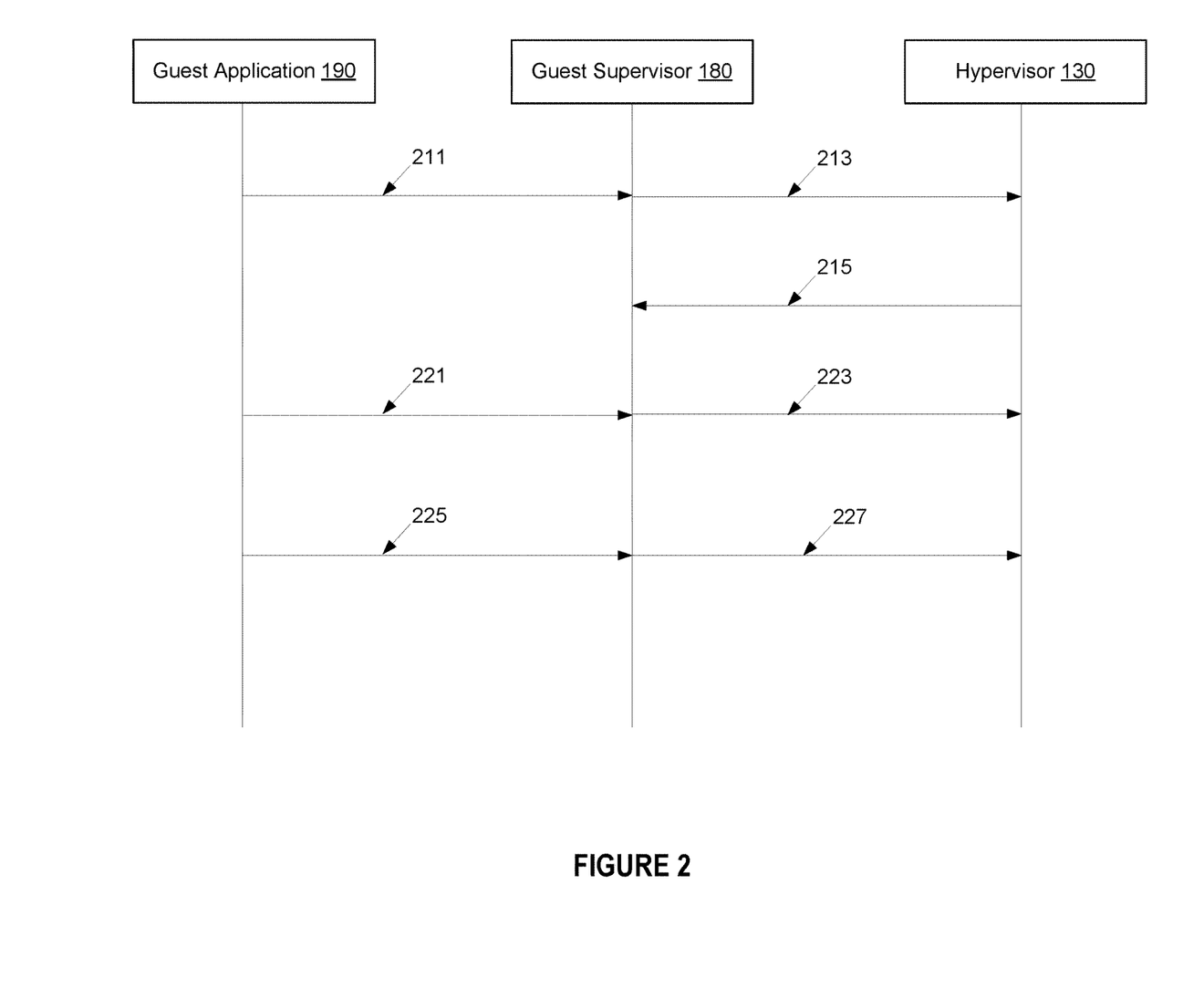
FIG. 2 is a diagram illustrating communications between a guest application, a guest supervisor, and a hypervisor according to an implementation of the disclosure.

FIG. 2 depicts a diagram 200 illustrating communications between the guest application 190, the guest supervisor 180, and the hypervisor 130 (e.g., the VM management component 132) in accordance with some implementations of the disclosure.

During initialization of guest application 190, guest supervisor 180 may allocate resources for guest application 190. For example, at 211, guest application 190 may send a resource request (also referred to the "first resource request") to guest supervisor 180. The first resource request may include a request for any resource to be allocated to guest application 190 (e.g., a processing resource, a memory resource). Upon receiving the request for resource allocation 211, guest supervisor 180 may forward the resource request to hypervisor 203 at 213. The first resource request may be forwarded to hypervisor 203, for example, by making one or more system calls for allocating the first resource. Upon receiving the forwarded first resource request, hypervisor 130 may allocate the resource requested by the first resource request to guest application 190 at 215. As such, during the initialization of guest application 190, hypervisor 130 allows direct system calls for allocating resources to application guest 201.

Upon completion of the initialization of guest application 190, guest application 190 may initiate packets processing and may run on the virtual machine using the first resource allocated to the guest application 190. At 221, guest application 190 may also send a message indicating the completion of the initialization of guest application 190 (also referred to as the "first message"). The first message may also indicate that packet processing is to be initiated in some embodiments. At 223, guest supervisor 180 may receive the first message and may generate a message indicating the completion of the initial stage of the initialization of guest application 190 (also referred to as the "second message"). Guest supervisor 180 may then send the second message to hypervisor 205. In some embodiments, the second message may include a hypercall. At 225, hypervisor 130 may receive the second message. Hypervisor 130 may also determine that the initialization of guest application 190 is complete in view of the second message. In view of the determination, hypervisor 130 may start blocking following hypercalls initiated by guest application 190 (e.g., by configuring the VMCS associated with the VM 170 to disable system calls initiated by the guest application 190). In some embodiments, hypervisor 130 may block a VM exit initiated by the virtual machine. Hypervisor 130 does not block a VM exit that is not initiated by the virtual machine (e.g., a VM exit caused by a hypervisor interrupt, such as a VM exit caused by a page fault). For example, hypervisor 130 may configure a CPU associated with the VM 170 (e.g., CPU 111) to transfer execution control of the virtual machine to guest supervisor 180 in response to receiving a request for a virtual machine exit initiated by VM 170. Hypervisor 130 may configure the CPU by configuring the VMCS associated with VM 170 (e.g., by configuring the VM exist control fields of the VMCS). While blocking the hypercalls initiated by guest application 190, hypervisor 130 may permit input/output (I/O) operations for the virtual device.

In some embodiments, after the completion of the initialization of guest application 190, guest application 190 may send a resource request to guest supervisor 180 (also referred to the "second resource request") at 225. The second resource request may include a request for allocation of any resource to guest application 190 (e.g., a processing resource, a memory resource). Upon receiving the second resource request, guest supervisor 180 may forward the second resource request to hypervisor 203 at 227. Upon receiving the second request, hypervisor 130 may reject allocation of resources to the virtual machine to fulfill the second resource request. Hypervisor 130 may also stop (e.g., kill) the virtual machine in view of the second resource request.

Figure 3:
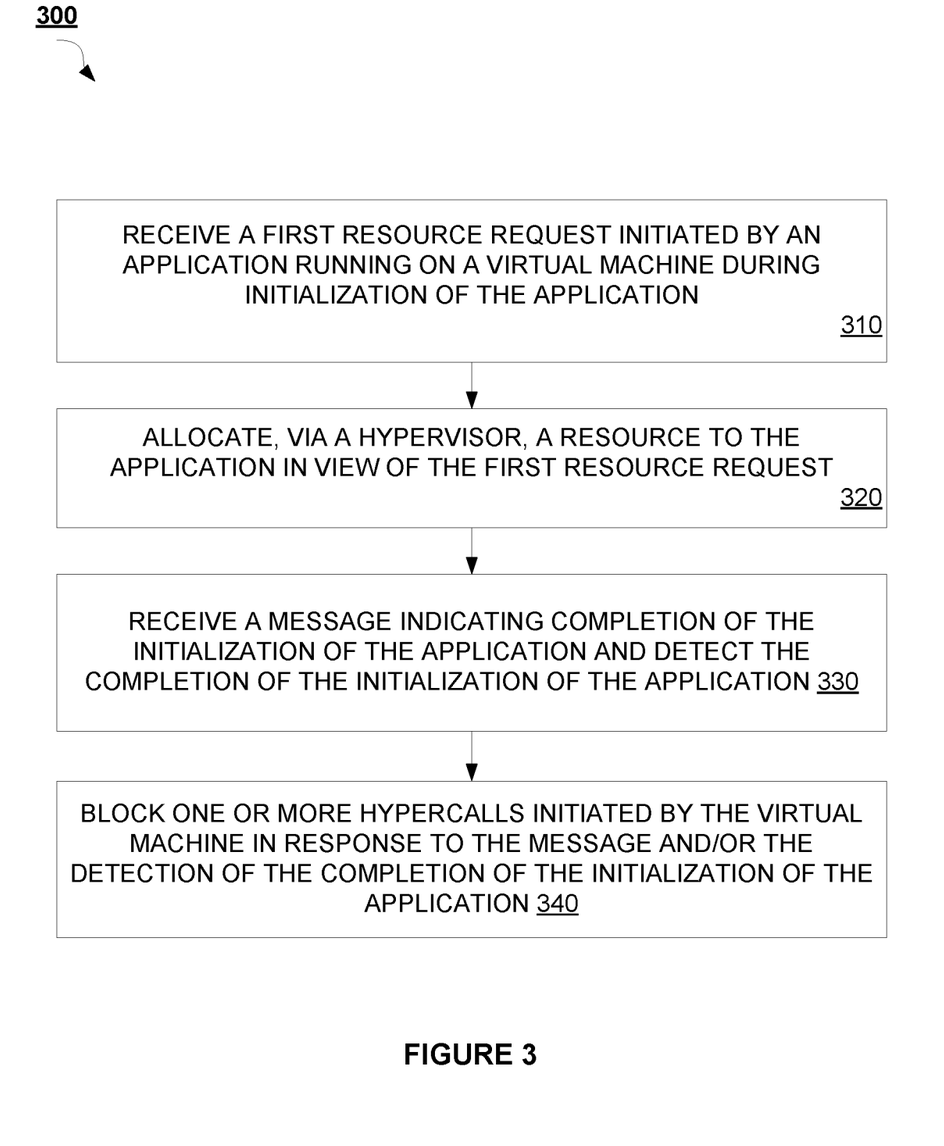
FIG. 3 is a flow diagram illustrating a method for securing virtual machine according to an implementation of the disclosure.

FIG. 3 is a flow diagram illustrating a method 300 for securing a virtual machine in accordance with some embodiments of the disclosure. Method 300 can be performed by processing logic that may comprise hardware (e.g., circuitry, dedicated logic, programmable logic, microcode, etc.), software (such as instructions run on a processing device), firmware, or a combination thereof. In one implementation, method 300 is performed by a processing device (e.g. a processing device 402 of FIG. 4) executing a hypervisor as described in connection with FIGS. 1 and 2.

Method 300 begins at block 310 where the processing device may receive a first resource request initiated by an application running on a virtual machine during initialization of the application. The first resource request may be and/or include a request to allocate a first resource to the application. The first resource may be a memory resource (e.g., a certain amount of a guest memory of the virtual machine), a processing resource, etc. The initialization of the application may include allocation of resources to the application by the hypervisor. In some embodiments, the application may be a DPDK application. The application may be and/or include a guest application as described in connection with FIGS. 1 and 2. In some embodiments, the first resource request may include a system call (e.g., a hypercall).

At block 320, the processing device can allocate, via a hypervisor, a first resource to the application in view of the first resource request. For example, the hypervisor may allocate the first resource to the application to fulfill the first resource request.

At block 330, the processing device can receive a message indicating completion of the initialization of the application. The message may include one or more messages (e.g., the first message, the second message) as described in connection with FIG. 2. In some embodiments, the processing device can also detect the completion of the initialization of the application in response to receiving the message. The completion of the initialization of the application may correspond to initiation of execution of the application on the virtual machine using the first resource allocated to the application. The completion of the initialization of the application may also correspond to the initiation of packet processing by the application.

At block 340, in response to detecting the completion of the initialization of the application and/or receiving the message, the hypervisor can block one or more hypercalls initiated by the virtual machine. For example, the hypervisor may receive a second resource request initiated by the application after the completion of the initialization of the application. The second resource request may include a request for a second resource (e.g., a memory resource, a processing resource, etc.). The second resource request may correspond to a hypercall. The hypervisor may reject allocation of resources to the application in response to the second resource request. The hypervisor may also stop the virtual machine in response to receiving the second resource request.

As another example, the hypervisor may block VM exits initiated by the virtual machine while performing VM exits initiated by the hypervisor. For example, the hypervisor may configure a VMCS associated with the virtual machine to disable system calls made by the guest application. In some embodiments, the hypervisor may configure a CPU associated with the virtual machine to transfer execution control of the virtual machine to a guest supervisor of the virtual machine. The hypervisor may configure the CPU by configuring a VMCS associated with the virtual machine (e.g., by configuring VM-exit control fields of the VMCS). In one implementation, the hypervisor may receive a request for a first VM exit initiated by the virtual machine and may refrain from performing the first VM exit. The CPU may transfer the execution control of the virtual machine to the guest supervisor in view of the request for the first VM exit. The hypervisor may also stop the virtual machine in view of the request for the first VM exit. In another implementation, the hypervisor may perform a second VM exit initiated by the hypervisor (e.g., a VM exit caused by a hypervisor interrupt). The second VM exit may be caused, for example, by a page fault.

Figure 4:
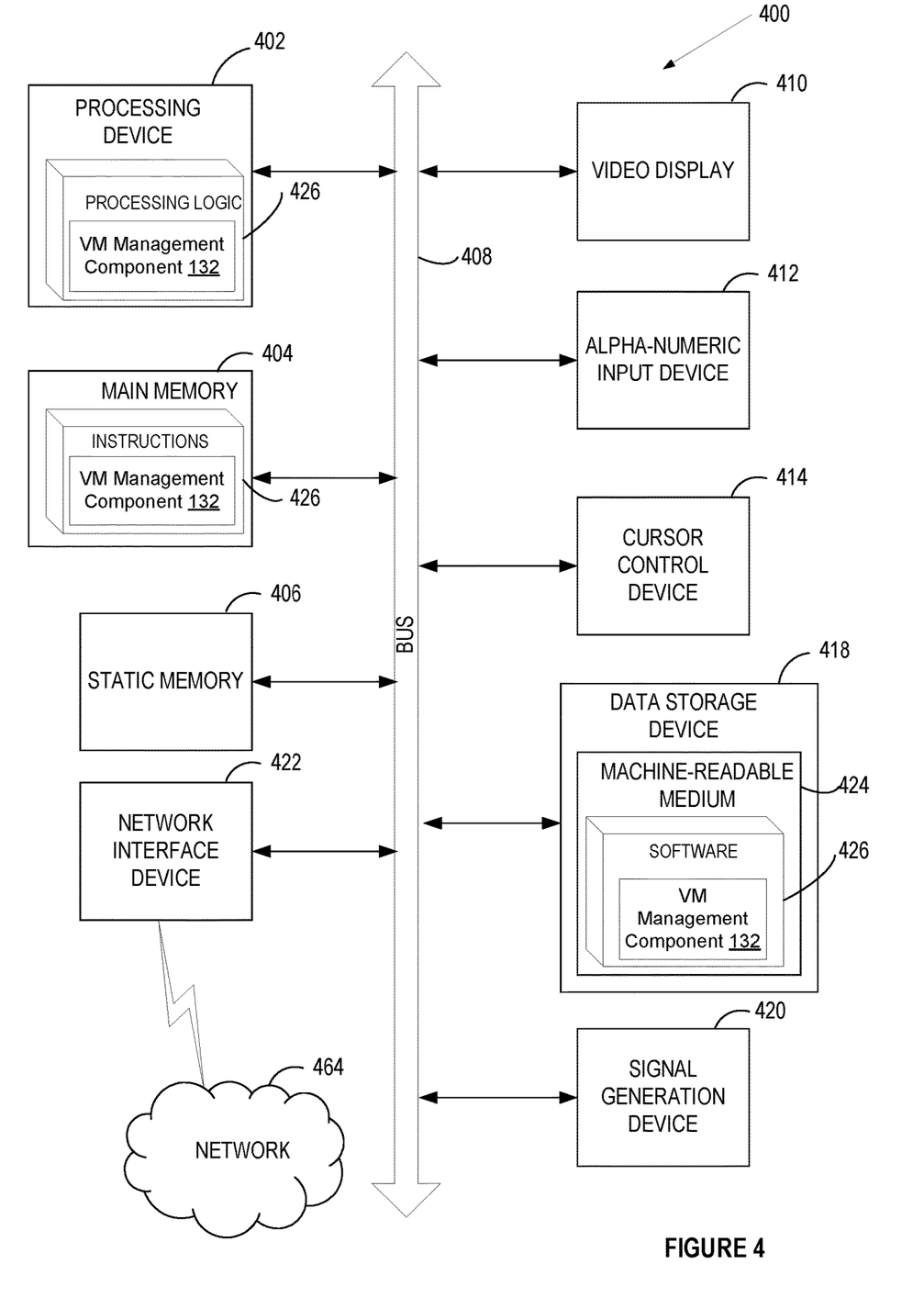
FIG. 4 illustrates a block diagram of one implementation of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 426 embodying any one or more of the methodologies of functions described herein. The software 426 may also reside, completely or at least partially, within the main memory 404 as instructions 426 and/or within the processing device 402 as processing logic 426 during execution thereof by the computer system 400; the main memory 404 and the processing device 402 also constituting machine-accessible storage media.

The machine-readable storage medium 424 may also be used to store instructions 426 to securing virtual machines, such as the VM management component 132 as described with respect to FIG. 1, and/or a software library containing methods that call the above applications. While the machine-accessible storage medium 424 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "stopping," "providing," "executing," "running," "blocking," "storing," "initializing," "storing," "allocating," "determining," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   receiving, prior to initiation of packet processing by a guest application executed on a virtual machine, a request to allocate a resource to the guest application;
   receiving an indication of a completion of initialization of the guest application with the allocated resource;
   intercepting, by a guest supervisor executed in user space on the virtual machine, a subsequent request to allocate the resource initiated by the guest application subsequent to the initiation of the packet processing by the guest application; and
   blocking, by a processing device, resource allocation to the guest application based on the subsequent request to allocate the resource intercepted by the guest supervisor executed on the virtual machine.

2. The method of claim 1, further comprising:
   receiving a message from the guest application indicating that the initialization of the guest application is completed; and
   determining whether the initialization of the guest application is completed based on the received message.

3. The method of claim 1, wherein blocking the resource allocation comprises:
   stopping the virtual machine executing the guest application.

4. The method of claim 1, further comprising:
   responsive to detecting an exit initiated by the virtual machine executing the guest application, transferring execution control of the virtual machine to the guest supervisor.

5. The method of claim 4, further comprising:
   configuring a central processing unit (CPU) to facilitate transferring the execution control of the virtual machine to the guest supervisor by configuring a virtual control structure associated with the virtual machine.

6. The method of claim 1, wherein the initialization of the guest application corresponds to at least one of a first initiation of execution of the guest application using an allocated resource or the initiation of the packet processing by the guest application.

7. The method of claim 1, further comprising:
   responsive to determining that the initialization of the guest application is not completed, allocating the resource for the guest application in response to the received request.

8. A system comprising:
   a memory; and
   a processing device operatively coupled to the memory, the processing device to:
   receive, prior to initiation of packet processing by a guest application executed on a virtual machine, a request to allocate a resource to the guest application;
   receive an indication of a completion of initialization of the guest application with the allocated resource;
   intercept, by a guest supervisor executed in user space on the virtual machine, a subsequent request to allocate the resource initiated by the guest application subsequent to the initiation of the packet processing by the guest application; and
   block resource allocation to the guest application responsive to the subsequent request based on the subsequent request to allocate the resource intercepted by the guest supervisor executed on the virtual machine.

9. The system of claim 8, wherein the processing device is further to:
   receive a message from the guest application indicating that the initialization of the guest application is completed; and
   determine whether the initialization of the guest application is completed based on the received message.

10. The system of claim 8, wherein to block the resource allocation, the processing device is further to:
    stop the virtual machine executing the guest application.

11. The system of claim 8, wherein the processing device is further to:
    responsive to a detection of an exit initiated by the virtual machine executing the guest application, transfer execution control of the virtual machine to the guest supervisor.

12. The system of claim 11, wherein the processing device is further to:
configure a central processing unit (CPU) to facilitate transferring the execution control of the virtual machine executing to the guest supervisor by configuring a virtual control structure associated with the virtual machine.

13. The system of claim 8, wherein the initialization of the guest application corresponds to at least one of a first initiation of execution of the guest application using an allocated resource or the initiation of the packet processing by the guest application.

14. The system of claim 8, wherein the processing device is further to:
responsive to a determination that the initialization of the guest application is not completed, allocate the resource for the guest application in response to the received request.

15. A non-transitory machine-readable storage medium including instructions that, when accessed by a processing device, cause the processing device to:
receive, prior to initiation of packet processing by a guest application executed on a virtual machine, a request to allocate a resource to the guest application;
receive an indication of a completion of initialization of the guest application with the allocated resource;
intercept, by a guest supervisor executed in user space on the virtual machine, a subsequent request to allocate the resource initiated by the guest application subsequent to the initiation of the packet processing by the guest application; and
block, by the processing device, resource allocation to the guest application based on the subsequent request to allocate the resource intercepted by the guest supervisor executed on the virtual machine.

16. The non-transitory machine-readable storage medium of claim 15, wherein the instructions, when executed by the processing device, cause the processing device further to:
receive a message from the guest application indicating that the initialization of the guest application is completed; and
determine whether the initialization of the guest application is completed based on the received message.

17. The non-transitory machine-readable storage medium of claim 15, wherein to block the resource allocation associated with the subsequent request, the instructions, when executed by the processing device, cause the processing device further to:
stop the virtual machine executing the guest application.

18. The non-transitory machine-readable storage medium of claim 15, wherein the instructions, when executed by the processing device, cause the processing device further to:
responsive to a detection of an exit initiated by the virtual machine executing the guest application, transfer execution control of the virtual machine to the guest supervisor.

19. The non-transitory machine-readable storage medium of claim 18, wherein the instructions, when executed by the processing device, cause the processing device further to:
configure a central processing unit (CPU) to facilitate transferring the execution control of the virtual machine to the guest supervisor by configuring a virtual control structure associated with the virtual machine.

20. The non-transitory machine-readable storage medium of claim 15, wherein the initialization of the guest application corresponds to at least one of a first initiation of execution of the guest application using an allocated resource or the initiation of the packet processing by the guest application.

* * * * *